United States Patent [19]

George, Jr.

[11] Patent Number: 5,759,589
[45] Date of Patent: Jun. 2, 1998

[54] APPARATUS FOR ENCAPSULATING FIELD WINDINGS OF ROTARY ELECTRIC MACHINES

[75] Inventor: Francis L. George, Jr., Sunset Hills, Mo.

[73] Assignee: P. D. George Company, St. Louis, Mo.

[21] Appl. No.: 613,842

[22] Filed: Mar. 11, 1996

[51] Int. Cl.[6] .................. B29C 45/02; B29C 45/14
[52] U.S. Cl. .......... 425/129.1; 425/544; 425/DIG. 228; 264/272.2
[58] Field of Search .................. 425/127, 128, 425/129.1, 544, DIG. 228; 264/272.11, 272.15, 272.19, 272.2

[56] References Cited

U.S. PATENT DOCUMENTS

| | | | |
|---|---|---|---|
| 1,925,892 | 9/1933 | Apple | 264/272.2 |
| 2,019,064 | 10/1935 | Apple | 264/272.2 |
| 2,058,938 | 10/1936 | Apple | 264/272.2 |
| 3,058,156 | 10/1962 | O'Connor | 264/272.2 |
| 3,256,590 | 6/1966 | Myers | 264/272.2 |
| 4,714,576 | 12/1987 | Cotton et al. | 264/272.2 |
| 4,845,837 | 7/1989 | Lloyd | 264/272.2 |
| 5,149,483 | 9/1992 | Okey et al. | 264/272.2 |
| 5,634,258 | 6/1997 | Onodera et al. | 264/272.2 |

Primary Examiner—Khanh P. Nguyen
Attorney, Agent, or Firm—Armstrong, Teasdale, Schlafly & Davis

[57] ABSTRACT

It is generally known that the most common reason for replacing rotary electric machines is failure of field windings. Vibrations and primary overheating of field windings is the main reason for motor and generator repair. Consequently field windings have been fan cooled, externally ventilated, and totally enclosed. To solve this failure problem stators have been completely encapsulated, drip coated, and entirely coated. But all of these procedures are subject to certain disadvantages. The method and apparatus herein overcome such disadvantages. The apparatus includes structural members for embedding in a solid material field windings of stators of rotary electric machines in order to insulate and cool electric machines in which the stators are employed.

11 Claims, 2 Drawing Sheets

10

APPARATUS FOR ENCAPSULATING FIELD WINDINGS OF ROTARY ELECTRIC MACHINES

FIELD OF THE INVENTION

This invention relates to rotary electric machines, also termed dynamoelectric machines, which convert electrical energy to mechanical energy or mechanical energy to electrical energy. Contemplated are electric motors, generators, alternators and the like, in which the stator is the type which includes a stator core carrying field windings and having a bore or cylindrical cavity in its center to receive a rotor or armature.

BACKGROUND OF THE INVENTION

It is generally known that the most common reason for failure of rotary electric machines, far more than locked bearings, is burnout of field windings. Primary overheating is the main reason for motor and generator repair. For this reason fan cooled, externally ventilated, and totally enclosed motors and generators have been developed.

Recently in order to solve the burnout problem, emphasis has been on molding methods, and on molds for completely encapsulating the stator core and coils, or field windings. In U.S. Pat. No. 4,950,438, for instance, a four piece mold is employed to overcome the drip method, that is the method wherein the stator is drip coated on only one side at a time during a coating cycle, followed by then turning the stator to coat it on the other side. In U.S. Pat. No. 4,950,438 the stator is entirely in the upright position while being coated. The four mold members are combined with the stator so that a cavity is formed between them and the stator. Vehicle is then poured into that cavity through sprues until it flows out of drain holes in the lower mold member.

Another sprue-type method for tradting rotary electric machines is described in U.S. Pat. No. 4,362,490. It was believed that when the stator was entirely coated with vehicle too large a volume of vehicle was utilized at a cost which was too high. The invention, then, was to eliminate the coating on the periphery of the stator. To do so upper and lower mold members were utilized to define an inner space around the coil. Through a sprue leading to this space a material was injected so that it flowed into that space to permeate the coil.

Because of the large volume of vehicle required by other electromagnetic coil coating methods the drip method still appears to be popular as illustrated in U.S. Pat. No. 5,474,799. The vehicle baking or curing temperatures were a matter of concern in that instance. The problem was solved by keeping the temperature of the iron stator core below the vehicle curing temperature by utilizing several curing temperature stages.

A submersible can-type electric motor, stated to be well-known, is the subject of U.S. Pat. No. 4,496,866. The bore of the stator core has a cylindrical can inserted therein to cover its inner wall. A vehicle is then inserted to be molded completely about the external surface of the stator core including the end portions of the coils.

In addition to vehicle-molded rotary electric machines such as those described, two related patents, U.S. Pat. No. 3,874,073 and U.S. Pat. No. 3,758,799, disclose the use of sand and other particulate materials such as alumina, mica, chalk, zirconia, beryllium oxide, and naturally occurring minerals, as heat dissipating matter around the windings which are supported on the stator core. Using a housing means around at least part of the stator the particulate material, along with vehicle, is forced in against the winding support.

It will be understood that one of the problems in utilizing sprues-or sprays as in FIG. 9 of U.S. Pat. No. 3,874,073—is that it is difficult, even when pressure is employed, to fill all of the interstices and to eliminate air voids in the stator windings. When the area formed by a mold is filled from above with a vehicle as viscous as those normally employed, it is difficult if not impossible to avoid the formation of air voids, pockets or pores. This is particularly true when particulate materials are incorporated in the vehicle. Voids are also difficult to prevent when the port holes used to enable air to escape from the windings are in the base of the mold. The prior art, then, is subject to certain disadvantages. By the practice of this invention a method and means are provided which overcome such disadvantages.

SUMMARY OF THE INVENTION

It will be appreciated that by this invention a rotary machine is provided which has more durable field windings. Means are provided for embedding in a solid vehicle field windings of stators of rotary electric machines in order to insulate and cool electric machines in which the stators are used. The stators are the type having stator cores each provided with a central cylindrical bore adapted to receive a rotor. The stator core carries field windings in channels in the face of the cylindrical bore. The field windings are looped outside those channels to form top and bottom field windings as they pass from one channel to another. Means for embedding these top and bottom field windings in a solid material are provided herein. Cylindrical sleeve means are adapted to surround the top and bottom field windings so that they are each within a sleeve. A cylindrical piston is adapted to fit slidably in the stator bore so that the field windings are then in annular spaces between the sleeve and the piston when the piston is within the stator bore. Closure means are adapted to close the annular space containing the bottom field windings so that only the upper annular space has an open end. A liquid vehicle, which on standing changes from a liquid to a solid state, is poured into the stator bore. Pressure means urge the piston into the stator bore to force the vehicle into the annular space throughout the bottom field windings and up the field windings channels to cover the top field windings. This encapsulates the top and bottom field windings by embedding them in a solidified vehicle.

DETAILED DESCRIPTION OF THE INVENTION

Since motors, generators, alternators, and the like are old and well-described in the prior art, they need not be lengthily described herein except to point out that in these rotary electric machines practically all of the electro/mechanical energy conversion takes place in the air gap between the stator and the rotor or armature. The energy conversion in the air gap is a result of a magnetic field set up by current-carrying windings in motors, or by windings moving in a magnetic field in the case of generators and alternators. These stator windings, also termed field windings, primary windings, or stator coils, thus, are the key to any rotary electric machine. Little wonder, then, that from their inception these windings have been protected in some way. They have been wrapped, and they have been coated or impregnated by drip coating and brush coating with, and later by dipping in, varnishes. The realization that it was vital to prevent destruction of field windings by heat, vibrations, and other environmental forces, has lead to molding processes such as those previously described, to the coating method of U.S. Pat. No. 5,474,799, and to the improvement herein. In order to explain this improvement more fully it will be described with reference to six figures in a drawing.

SPECIFIC EMBODIMENT OF THE INVENTION

Figure 1:
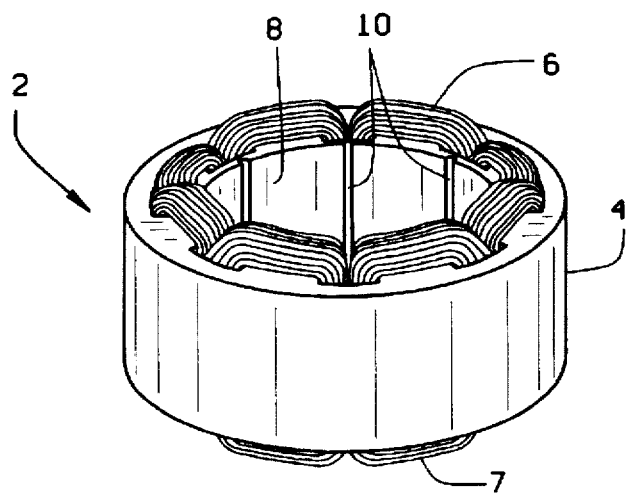
FIG. 1 is an isometric view showing a stator with its stator coil which is to be impregnated by the process of the invention.

It is to be appreciated that even though the improvement of rotary electric machines is a matter which is dealt with herein the rotor is not being shown in the drawings. Such rotors or armatures are very well known, and they are not the essence of this invention. Rather, members of rotary electric machines with which this invention is concerned are illustrated. These elements, shown in FIG. 1, include a stator 2 consisting of an iron stator core 4, and top and bottom field windings 6 and 7, termed top and bottom coil heads in U.S. Pat. No. 5,474,799, along with central cavity or stator bore 8 in the stator core. Other components of the invention are depicted in FIG. 2.

As explained in U.S. Pat. No. 5,474,799 iron core 4 has a series of internal axially extending slots, shown as channels 10 in FIG. 1 herein. Each channel 10, usually lined with a ground insulating paper referred to as a top stick, accommodates copper wires which are wound through the channels to form the stator coils. The stator coils protrude axially from both ends to form top and bottom field windings 6 and 7 as they loop from one channel to another. It is these top and bottom stator coils, or field windings 6 and 7, which are protected and mechanically stabilized against vibrations. Herein an expedient means for protecting field windings is provided. The essential elements utilized in the process include a sleeve 11, a piston 12, and a closure means 22, whose functions will be described subsequently in connection with the operation or method of the invention.

Referring now to the components per se, piston 12 is an element in the form of a strong plastic or metal cylinder. Whether the cylindrical piston is a hollow or a solid cylinder is less important than its size and its strength. It is adapted to fit snugly in the central cavity 8 within the stator core which a rotor or armature usually occupies. The size of the cylinder, thus, depends upon the rotary electric machine size, actually on the size of bore 8 in stator core 4. The cylindrical piston 12 should be at least as long as the distance from the tops of the top and bottom field windings 6 and 7, so that the field windings are in an annular space between the sleeve and the piston. The piston is slidable in the stator core bore to confine a vehicle which later will rise through the channels. Like any piston, cylinder 12 should be strong enough to withstand the pressure applied to it during use.

The sleeve 11, on the other hand, is an open-ended cylinder or tube. Its size is also related to the size of the stator. Sleeve 11, seen in FIG. 2, should slide over the outside of the stator core 4 as shown in that figure, fitting closely around the outside of the stator core as illustrated.

Employed in conjunction with sleeve 11 is a closure means 22 adapted to close off one of the open ends of sleeve 11. Various closure means can be used. In the specific embodiment shown in FIG. 2 the means which closes one end of sleeve 11 is in the form of a sleeve bottom when the sleeve is stood on one of its ends. This closure means is structured as a base plate 22 having an upwardly projecting retainer plate or disk 14 mounted thereon. Retaining disk 14 is provided with a tapered edge to accept sleeve 11 and to provide a seal therebetween. This structure makes it easier to separate the two after treating the stator. As illustrated in FIG. 2, when sleeve 11, with the stator within it, is in a vertical position seated on tapered disk 14 of plate 22, stator 2 is contained in a cylindrical vessel or container. The reason for the container will be appreciated given the method of utilizing components of the invention.

One of the features of the invention is the use of pressure to eliminate air bubbles and voids as the bottom and top field windings 7 and 6 are being embedded in a liquid vehicle which later solidifies.

Another feature of the invention is that the pressure process renders it easier to include fillers in the vehicle employed. Such fillers improve the cooling characteristics of the resulting rotary electric machines.

During the encapsulation process then, stator 2 is stood on one end as indicated so that it can be rested on retaining disk 14 on base or closure plate 22 as shown in FIG. 2. Sleeve 11 is then slipped over the stator and seated on retaining disk 14. The stator is now, in effect, in a container which is open at the top. A quantity of a liquid vehicle sufficient so that the stator core and windings will be embedded in it when it cures is determined by any known means, for instance by first utilizing some non-reactive or inert liquid. The vehicle, which may or may not contain a filler, is then poured into stator core bore 8, represented as 20 in FIG. 2. Piston 12 is then inserted in the bore.

To impregnate the top and bottom field windings 6 and 7, piston 12 is urged into the stator core bore or cavity by any of various known piston drive means 26 which are depicted generically in FIG. 2. After impregnating the bottom field windings 7, the vehicle 20, confined by sleeve 11 and piston 12, is forced up the internal axially extending channels 10 to the area containing the top field windings 6. The piston 12 continues to advance, allowing air bubbles to escape, eliminating voids in the resulting encapsulation. Since piston 12 is only slidable in stator bore 8, channels 10 are filled (on both sides of the top sticks if they are used) until the vehicle encounters the surface of the piston. This results in the formation of only a thin film of vehicle on the surface in the stator bore 8. Likewise, since sleeve 11 fits tightly over stator core 4, only a thin film forms on the outside surface of the stator core.

Figure 3:
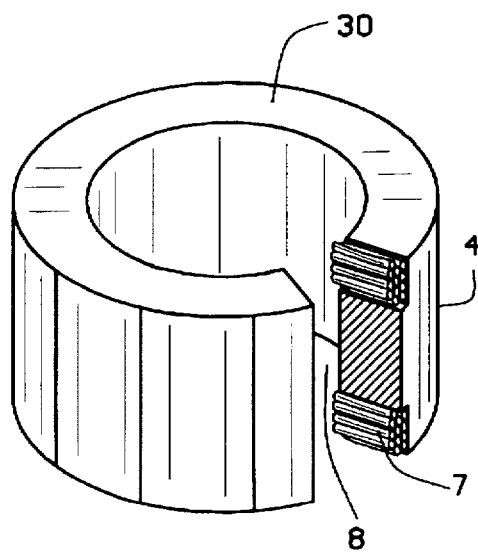
FIG. 3 is an isometric view showing the stator of FIG. 1 after its field windings have been impregnated in a solid vehicle by the process of the invention.

After impregnation, when the vehicle is partially cured, the sleeve and piston are withdrawn and the vehicle is permitted to completely cure. The stator, then, looks like that illustrated in FIG. 3 rather than that in FIG. 1. It resembles a large cylindrical ring with thick walls 30 and the field windings enclosed in an annulus. Using this stator the rotary electric machine is then fabricated in the conventional manner.

The term "vehicle" is utilized herein as it is used in the coatings industry wherein a vehicle is a liquid binder which changes from a liquid to a solid state by evaporation, oxidation, polymerization or reaction with a cross linking agent, commonly referred to as a curing agent. These compositions are will known in the art, and they are exemplified in such patents as U.S. Pat. No. 3,874,073 noted in the background of the invention. Included are various resins, for example, bisphenol-derived polyepoxides, novolacs, and polyesters. In addition other epoxide resins, polycarbonates, cross-linked polyethylenes and polypropylenes, and some vinyl polymers can be used, none of which need be discussed at length herein. It has also been pointed out that U.S. Pat. Nos. 3,874,073 and 3,758,799, suggest the use of various fillers. Preferred herein are such fillers as silica or fine sand, slate, mica, ores, minerals, chalk, alumina, calcium carbonate, starch, talc, bentonite, magnesium oxide and other particles. All of these can be used as particulate materials for inclusion in the resins herein. In fact, we have found that a very high solids resin composition, that is one with a high sand (silica flour) to resin ratio, is very effective. Using more sand than resin has been found to greatly cut the cost of the rotary electric machines.

Most stators are generally cylindrical so that a sleeve such as sleeve 11 can be snugly disposed over them. Some stators, however, are substantially rectangular such as stator 40 illustrated in FIG. 4. They are, of course, still provided with normal bores 41 and axial channels 42. Referring to that figure, a rectangular sleeve could be employed according to the teachings of the invention, but it would be impractical to fill the entire stator surface between edge of core 47 and the piston 60 with the vehicle. Rather a two-part sleeve, smaller than the outside of the stator, is employed in the form of upper and lower sleeve sections. Referring to FIG. 5, the upper sleeve section is designated 50 and the lower section 52.

Employed in conjunction with lower sleeve section 52 is a closure means adapted to close off the bottom end of that sleeve. However an extra seal can be eliminated if the closure plate, plate 54, is integral with the lower sleeve section 52 rather than being separate as shown in FIG. 2. Using such an arrangement, one lower seal 56 and one upper seal 58 can be used. Since seals should be used between the bottom of the sleeve sections and the stator core surfaces 46, three seals would be necessary if the lower sleeve section and the closure plate were separate elements.

Figure 2:
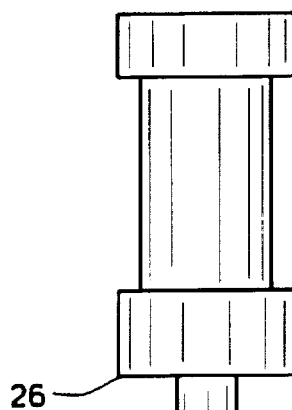
FIG. 2 is a diagrammatic sectional representation illustrating the components of the invention and their use in the process.
Figure 2:
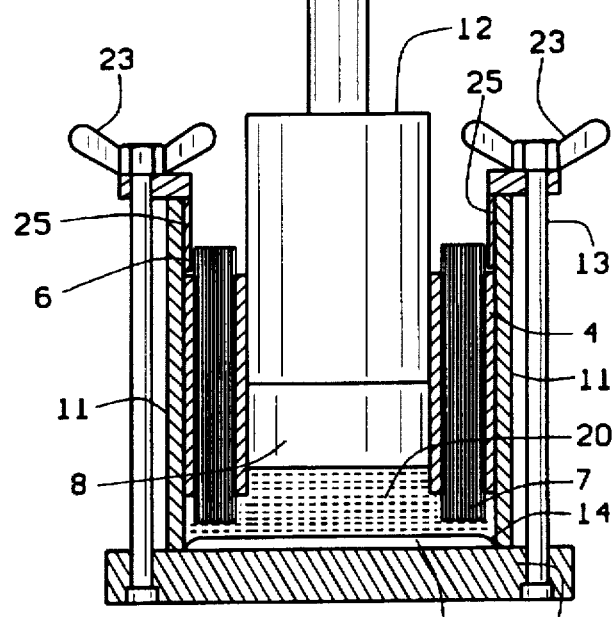
Figure 4:
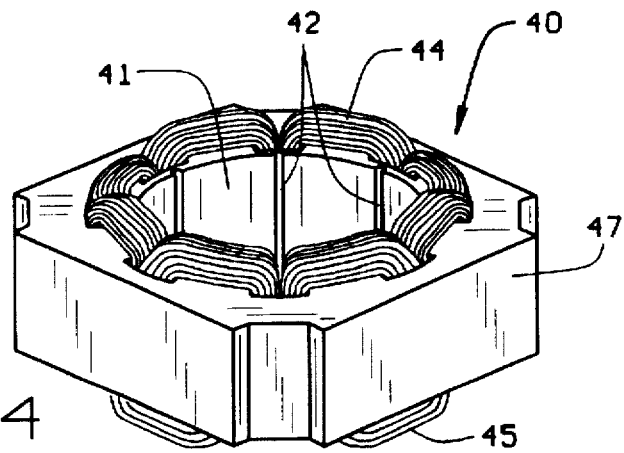
FIG. 4 is an isometric view showing a stator with a different configuration whose stator coils are to be impregnated by the process of the invention.
Figure 5:
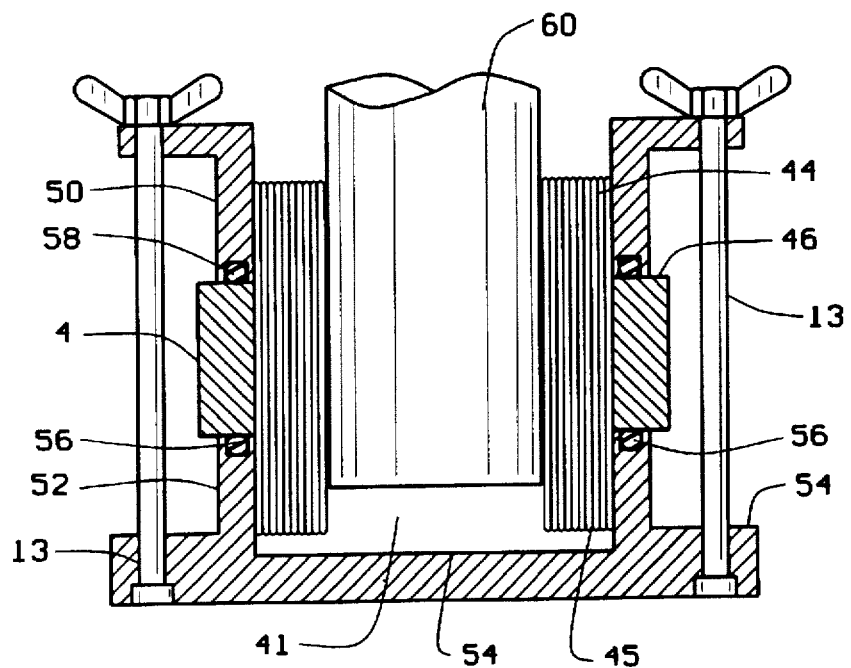
FIG. 5 is a diagrammatic sectional representation illustrating the components used to impregnate the stator coils shown in FIG. 4.

As were the field windings of the rotor shown in FIG. 1, field windings 44 shown in FIG. 4 are covered within a liquid vehicle in a manner that minimizes or eliminates air bubbles and voids as those top and bottom field windings 44 and 45 are being embedded in the vehicle.

Figure 6:
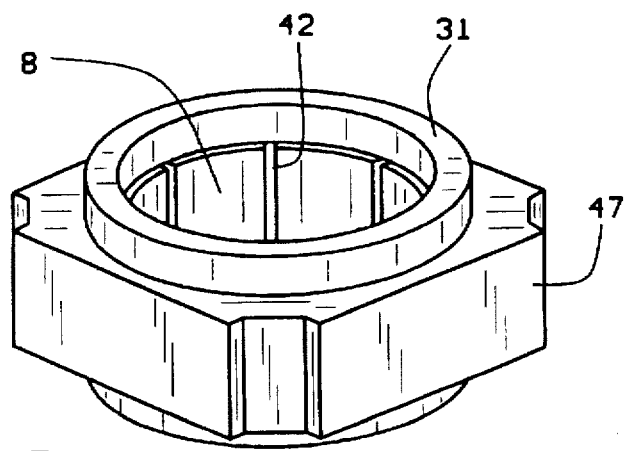
FIG. 6 is an isometric view showing the stator of FIG. 4 after its field windings have been impregnated by the process of the invention.

As previously described stator 40 is stood on one end. It is then rested on lower sleeve section 52 with seal 56 in place. Upper sleeve section 50, carrying seal 58, rests against the top surface 46 (FIG. 4) of stator 40. As explained hereinbefore the stator is again, in effect, in a container which is open at the top. As before the vehicle, with or without a filler, is poured into stator core bore 41. Piston 60 is then inserted in the bore and forced into that stator core bore or cavity to impregnate the bottom field windings 45 and top field windings 44. As earlier described after impregnating the bottom field windings, the vehicle is forced up the internal axially extending channels 42 to the area containing the top field windings. The piston continues to advance, allowing air bubbles to escape and eliminating voids in the resulting encapsulation. After being permitted to completely cure, the stator looks like that illustrated in FIG. 6 with its field windings enclosed as in FIG. 3. Using this stator the rotary electric machine is fabricated in the usual manner.

It can be seen that by the practice of this invention field windings or coil heads can be encapsulated by means superior to prior art methods. By embedding the field windings in a solid rather than merely coating the windings a more effective means of protecting the windings is provided. With air tending to rise, holes around the base of a mold as in the prior art rather than an open top are not as effective in preventing air entrapment. Further, known molding methods as vehicle fills a mold it is difficult for the vehicle to fill all of the interstices in the field windings and thus avoid the creation of voids if the air in them cannot rise to escape. This invention, then, greatly improves present means involving embedding stators in resinous materials.

Having been given the principles of the invention ramifications and variations of the invention will occur to those skilled in this art. As an example it will be seen that if the vehicle in which the stator is to be embedded is too viscous it will tend to lift the stator off of the closure base plate (22). Accordingly it will be desirable to include a clamping means to hold the plate, sleeve and stator in place during the encapsulation process. Various clamping means such as ski boot clamps and offset hinge means can be used. Illustrated herein is a simpler means including studs 13 and hold down hooks 25 which abut stator core 4 and sleeve 11 to hold them down during the impregnation process. Studs 13, which can be bolts, pass through holes in the base plate upon which the stator rests. The studs then pass through holes in hooks 25, which also rest against the sleeve. The hooks thus not only keep the stator from rising, but protect the field windings as well. Wing nuts 23 are then tightened to hold the structure in place. This structure prevents the vehicle, when compressed, from lifting the stator, and possibly the sleeve, from the closure, that is, away from its base plate. Yet the hooks allow air to be readily forced out of the stator by the vehicle. Other clamping or retaining means such as hold down rings, jaws and the like can also be used to hold the stator and sleeve against the base plate when pressure is applied to the piston during use.

It will also be obvious that whereas a base plate has been shown, other sleeve closing means can be utilized. As an example instead of a base plate a lid can be screwed on or otherwise placed over the open end of the sleeve. And, although it will not be as easily to clean and use, the closure plate can be integral with the sleeve. A stand can also be used to hold down the stator during the pressure step. In addition, whereas the groove 14 functions as a labyrinth seal, a rubber or plastic gasket can be inserted between the plate closure and the sleeve. It will also be obvious to use a mold release to render it easier to remove the sleeve and the piston after the vehicle is partially cured.

A particularly important variation of the invention involves the use of a piston liner. Prior to its insertion in the stator bore the piston can be provided with a plastic wrapper in the form of a plastic sheet which is disposed around the outside of the piston. The piston can then readily be withdrawn from the core after the binder partially cures. This has been found to be more effective than the use of a mold release.

Another important embodiment of the invention concerns sleeve 11. Whereas in some instances it will be desirable to remove the sleeve prior to fabricating the rotary electric machine, it is to be understood that the sleeve can also serve as the casing or housing for the ultimate rotary electric machine. In that instance the sleeve need not be removed. In other words, the sleeve will be fabricated in the cylindrical configuration of, and the metal desired for, the casing for the finished rotary electric machine. Accordingly after encapsulation it will be necessary to replace the piston (12) with the rotor and attach, for example, the two motor ends to the casing.

Another important variation concerns the means for applying the pressure to the piston which forces the vehicle throughout the field windings. A generic representation has been illustrated in the drawing because mechanical, electrical, hydraulic and pneumatic piston drives are all in general use. Drill and other presses and various stamping and cutting machines are piston driven, and all of those well known piston drive means are within the contemplation of this invention.

It will also be appreciated that the process of the invention applies not only to new rotary electric machines, but to old or existing machines being rebuilt, or improved by embedding the field windings in a solid material. These and other such modifications are deemed to be within the scope of this invention.

What is claimed is:

1. Means for embedding in a solid vehicle field windings of stators of rotary electric machines in order to insulate and cool electric machines in which the stators are used, the stator being the type having a stator core provided with a central cylindrical bore adapted to receive a rotor, with that stator core carrying field windings held in channels in the face of the cylindrical bore, and looped outside those channels to form top and bottom field windings as they pass from one channel to another, means for embedding the field windings in a solidified vehicle comprising sleeve means adapted to form a cylinder to surround the top and bottom field windings so that they are each within a sleeve, a cylindrical piston adapted to fit sildably in the stator bore so that the field windings are in annular spaces between the sleeve and the piston when the piston is within the stator bore, closure means adapted to close the annular space containing the bottom field winding end turns so that only the upper annular space has an open end, a liquid vehicle which on standing changes from a liquid to a solid state, means for pouring the liquid vehicle into the stator bore, pressure means for urging the piston into the stator bore to force the vehicle into the annular space throughout the bottom field windings and up the field windings channels to cover the top field winding thus embedding the top and bottom field windings and encapsulating the field windings in the channels therebetween.

2. The field windings-embedding means of claim 1 wherein the sleeve means is a cylindrical sleeve adapted to fit slidably around the stator to form in conjunction with the piston the two field windings annular spaces.

3. The field windings-embedding means of claim 2 wherein the sleeve is an outer casing which houses the rotary electric machine.

4. The field windings-embedding means of claim 2 wherein the vehicle is a resin.

5. The field windings-embedding means of claim 4 wherein the resin is a polyepoxide.

6. The field windings-embedding means of claim 5 wherein the vehicle contains a filler.

7. The field windings-embedding means of claim 5 wherein the piston is provided with an outer plastic wrapper.

8. The field windings-embedding means of claim 1 wherein the cylindrical sleeve means includes top and bottom cylindrical sleeve sections for square stators.

9. The field windings-embedding means of claim 1 wherein the closure means is a plate having with an integral tapered retaining disk adapted to receive the sleeve.

10. The field windings-embedding means of claim 1 wherein means are provided to hold the sleeve means and stator in place when the pressure means urges the piston into the stator bore.

11. The field windings-embedding means of claim 1 wherein the pressure means is a mechanical piston drive means.

* * * * *